Figure 1:
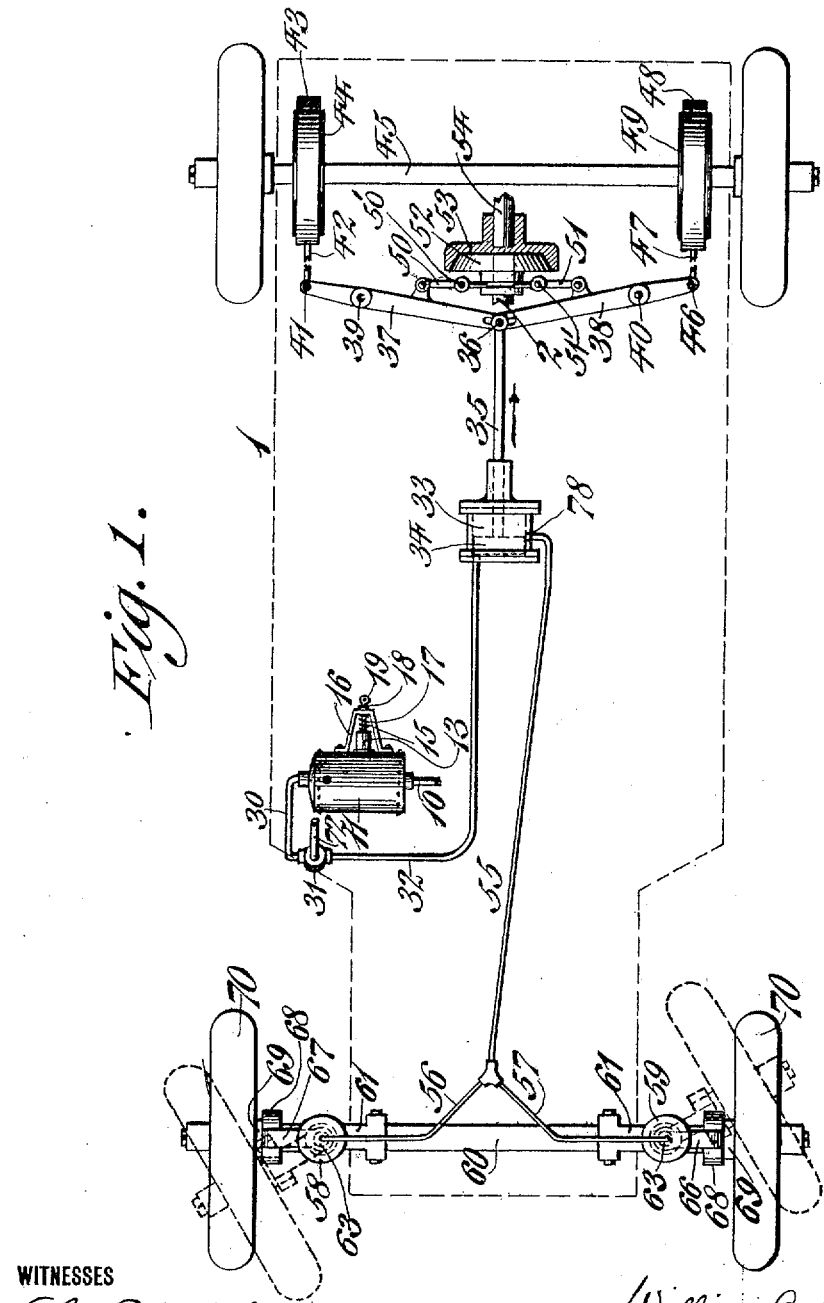

W. B. WEST.
AIR BRAKE AND CLUTCH MECHANISM.
APPLICATION FILED NOV. 22, 1909.

966,282.

Patented Aug. 2, 1910.

3 SHEETS—SHEET 1.

WITNESSES
L. Douville,
P. F. Nagle.

INVENTOR
William B. West.
BY Wiederscheim & Fairbanks.
ATTORNEYS

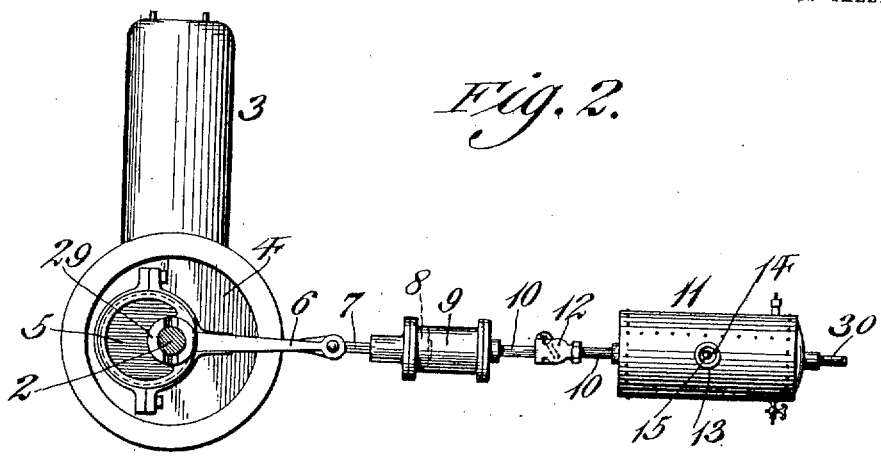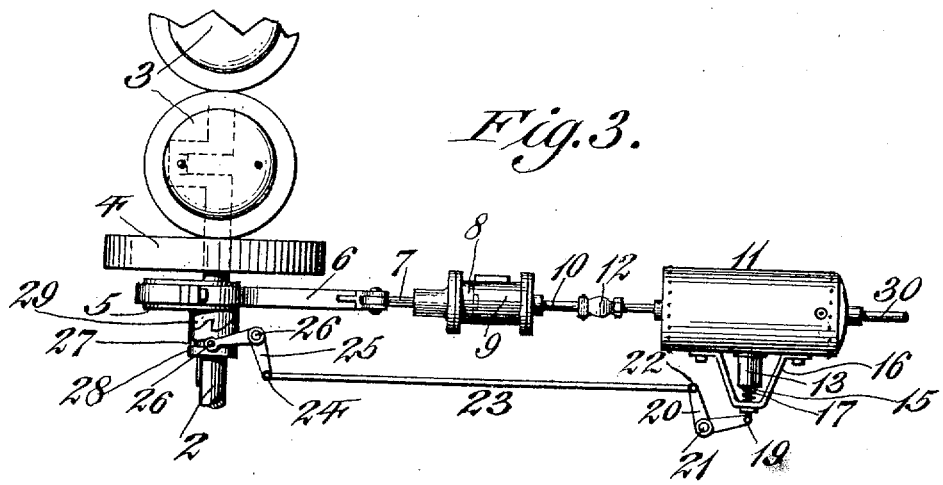

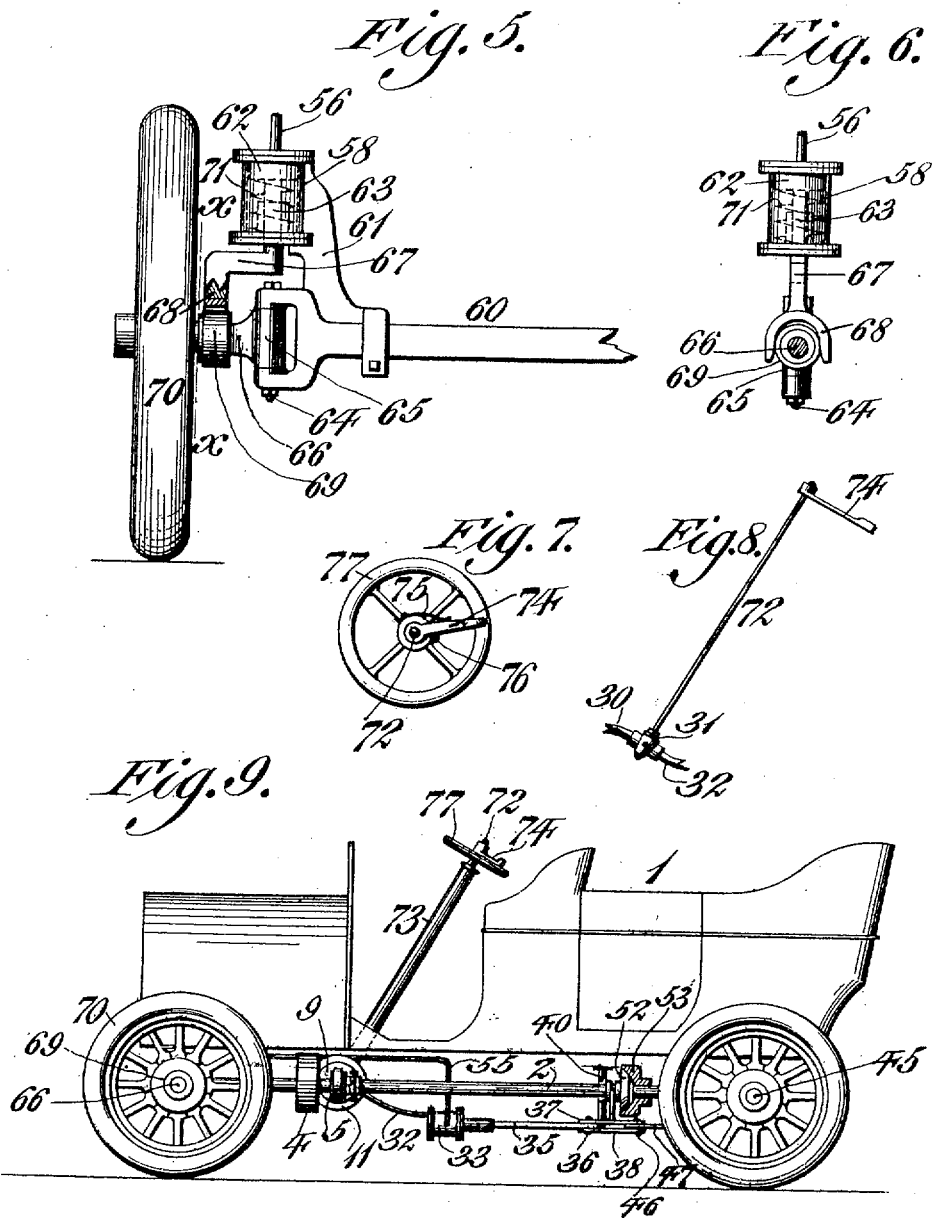

UNITED STATES PATENT OFFICE.

WILLIAM B. WEST, OF PHILADELPHIA, PENNSYLVANIA.

AIR-BRAKE AND CLUTCH MECHANISM.

966,282. Specification of Letters Patent. Patented Aug. 2, 1910.

Application filed November 22, 1909. Serial No. 529,248.

*To all whom it may concern:*

Be it known that I, WILLIAM B. WEST, a citizen of the United States, residing in the city and county of Philadelphia, State of Pennsylvania, have invented certain new and useful Improvements in Air-Brakes and Clutch Mechanism Adapted to be Used More Particularly on Automobiles, and of which the following is a specification, reference being had to the accompanying drawings.

A purpose of my invention is to provide an air brake for automobile construction which shall be automatically maintained at a sufficient pressure.

A further purpose of my invention is to provide such a brake which shall be applied on the rear portion of the machine first and subsequently to the front portion of the machine, the order of application being controlled automatically.

A further purpose of my invention is to provide an air brake for automobile use which shall automatically disconnect the running gear from the engine at the time the brake is applied.

A further purpose of my invention is to provide an air brake construction for automobile use which shall apply the brake to the front stub axles without regard to the steering position of said axle.

A further purpose of my invention is to provide an air brake for automobiles having various advantages and features of construction as will be hereinafter more fully pointed out in the claims.

It further consists of other novel features of construction, all as will be hereinafter more fully set forth.

For the purpose of illustrating my invention, I have shown, in the accompanying drawings, one form thereof which is at present preferred by me, since the same has been found to give satisfactory and reliable results.

Figure 1 is a plan view, largely diagrammatic, of certain portions of the device which I have chosen to illustrate. Fig. 2 is a side elevation of certain detached portions of the device. Fig. 3 is a plan view of the parts seen in Fig. 2. Fig. 4 is a longitudinal vertical section of a form of reservoir and adjuncts made use of by me. Fig. 5 is a side elevation of a portion of the front axle of an automobile with certain portions of the brake mechanism in position thereon. Fig. 6 is a vertical section on line x—x in Fig. 5. Fig. 7 is a plan view of a form of steering wheel and brake operating lever employed. Fig. 8 is a side elevation of the lever seen in Fig. 7 and other portions of the device. Fig. 9 is a side elevation of an automobile with my device applied thereto.

Similar numerals of reference indicate corresponding parts in the figures.

Referring to the drawings:—Journaled in the frame of the automobile 1, in the usual manner, is a crank 2 which is driven by any suitable engines 3. 4 designates the balance wheel secured to said shaft 2.

Loosely mounted on the shaft 2 I show a portion of my preferred structure, an eccentric 5 that imparts motion to the rod 6 so as to operate the piston rod 7 and consequently the piston 8 secured thereto and fitted within the cylinder 9 that is supported in any suitable manner in the frame of the machine. In the form shown, the cylinder 9 is connected at one end to a pipe 10 whose opposite end is connected with a reservoir 11 for compressed air. The pipe 10 is provided with a check valve 12 to prevent reverse flow of the air in the reservoir 11. The reservoir 11 communicates with the interior of a cylinder 13 so that the air therein may operate a piston 14 fitted within said cylinder 13 for a purpose hereinafter described.

The piston 14 is provided with a rod 15 that slides freely in the guide bar 16 and has fitted thereon a spring 17 one end of which bears against the piston 14 while its opposite end abuts against the guide bar 16, it being observed that said rod 15 is provided with a collar 18 that limits the inward movement of the piston 14 by reason of the contact of said collar 18 with the guide bar 16.

The piston 15 has pivoted thereto at eye 19 one extremity of a bell crank lever 20 fulcrumed at 21 to the frame of the machine. These various details of construction may of course be modified while obtaining at least a part of my invention.

The bell crank lever 20 has pivoted thereto as at 22 one end of a rod 23 whose opposite end is pivoted at 24 to a bell crank lever 25 fulcrumed at 26 to the frame of the machine, it being observed that the bell crank lever 25 is provided with a pin or stud 26 that engages a groove 27 in the clutch member 28 that is feathered or splined on the crank shaft 2. Evidently other connections could be made between the piston and a form of clutch.

Any clutch member 28 rotatable with the shaft 2, is adapted to engage a clutch member shown as 29 integral with or secured to the eccentric 5 so as to rotate in unison therewith to effect the engagement and disengagement of the eccentric with the shaft 2.

The reservoir 11 has other connections, here illustrated as a pipe 30 provided, in the present instance, with a three-way cock 31 that has connected therewith one end of a pipe 32 whose opposite end is connected with a cylinder 33. The said cock 31 controls the passage of pressure fluid through the pipe and exhausts the same when positioned for this purpose. In this is fitted a piston 34 provided with a rod 35 that has pivoted thereto as at 36 the ends of the levers 37 and 38 fulcrumed at 39 and 40 respectively, in the frame of the machine.

The brake connections which I have illustrated are as follows: The end 41 of the lever 37 has pivoted thereto a rod 42 that is connected with the brake band 43 that coöperates with the brake pulley 44 fast on the rear axle 45.

The lever 38 has pivoted thereto as at 46 a rod 47 that is connected with the brake band 48 that coöperates with the brake pulley 49 fast on the rear shaft 45.

The levers 37 and 38 impart motion to the levers 50 and 51 respectively pivoted at 50' and 51' in suitable frame parts, so that said levers 50 and 51 may move the clutch member 52 on the shaft 2 so as to either bring said clutch member 52 into engagement with the clutch member 53 fast upon the shaft 54 or else remove the clutches from engagement, in order that the setting of the brake may coincidently open this connection between shaft 2 and shaft 54, disconnecting the engine from the driving wheels of the car. When the brake is released, driving connection between the engine and the driving wheels is reëstablished through the clutches stated and any train of gear wheels of any well known system now in use on automobiles. I also prefer to connect cylinder 33 with one end of a pipe 55 that is provided with the branches 56 and 57 that connect with the cylinders 58 and 59 respectively with other coöperating structure to set front brakes in preferred time relation to the setting of the rear brakes.

The front axle 60 has secured thereto the standards 61 that support, respectively, the cylinders 58 and 59 which are each provided with a piston 62 whose rod 63 is in the same vertical axis as that of the pivot pins 64 on which are fitted the hubs 65 of the steering stub shafts 66 of the front axle 60.

The piston rods 63 are each provided with an arm or lever 67 whose lower extremity terminates in a yoke 68, best seen in Fig. 6, and engages the hub 69 of the front wheel 70 that coöperates with said yoke to provide a brake bearing therebetween. The piston rods 63 are each encircled by a spring 71 whose upper extremity bears against the underside of its respective piston 62 while its lower extremity bears against the bottom of the cylinder so as to normally retain the pistons 62 in their elevated positions.

The valve in the air cock 31 has connected therewith the lower extremity of a rod 72 which latter passes through the steering column 73 and has a lever 74 secured to its upper extremity, which is retained in its normal position by a spring 75, seen in Fig. 7, that holds it against a stop 76 on the steering column 73.

The operation is as follows:—Assuming the several parts of the device to be in the positions seen in the drawings, it will be observed that the clutch members 28 and 29, seen in Fig. 2, are interlocked and that the brake bands 43 and 48, seen in Fig. 1, are disengaged from the brake pulleys 44 and 49 respectively and that the clutch members 52 and 53 are in engagement.

When the engine 3 is started it imparts motion to the main drive shaft 2 and eccentric pulley 5 which by reason of the rods 6 and 7 imparts a reciprocating movement to the piston 8 fitted within the cylinder or air compressor 9 which may be of any well known type.

The air from the compressor 9 passes through the pipe 10 and check valve 12 and enters the reservoir 11, thereby supplying the latter with compressed air. When the air pressure within the reservoir 11 upon the piston 14 exceeds the pressure of the spring 17, seen in Figs. 2 and 3, said spring is compressed or yields and allows outward movement of the piston 14 which, through the rod 15 and bell crank lever 20 rocks this bell crank lever and also bell crank lever 25, and thus removes the clutch member 28 from its engagement with the clutch member 29, whereupon the eccentric 5 ceases to rotate and consequently stops pumping air into the reservoir 11.

When it is desired to bring the automobile 1 to a sudden stop, the operator pushes the lever 74 with his thumb of either hand having hold of the steering wheel 77. This movement of the lever 74 turns the rod 72 and thus operates the valve in the air cock 31, and opens communication between the reservoir 11 and cylinder 33 through the pipe 32, whereupon the compressed air from the reservoir 11 enters the cylinder 33 and moves the piston 34 and its rod 35 in the direction indicated by the arrow in Fig. 1. This movement of the rod 35, through the pivotal connection at 36 with the levers 37 and 38 turns said levers on their fulcrums 39 and 40 respectively, exerts a pull upon the rods 42 and 47 and thus applies the brake bands 43 and 48 to their respective brake pulleys 44 and 49 fast on the rear axle 45. The movement of the levers 37 and 38 is transmitted to the levers 50 and 51 causing said levers to remove the clutch member 52 from its engagement with the clutch member 53 whereupon the shaft 54 and the gearing driven thereby are released from driving connection with the drive shaft 2. The spring of the brake bands or other suitable means may be used to reset the parts, including piston 33.

When the piston 34, in its brake setting movement, uncovers the port 78, in the cylinder 33, a portion of the compressed air in the said cylinder flows through the pipe 55 and its branches 56 and 57 and enters the cylinders 58 and 59 to depress the pistons 62, though against the resistance of the springs 71.

The downward movement of the pistons 62 is transmitted to the piston rods 63 and consequently to the yokes 68 in the lower extremities of the arms 67, causing said yokes to bear firmly upon the brake surfaces at 69 on the stub axles 66 of the front wheels 70 thereby acting as brake-shoes for said wheels.

The brake-shoes 68 are made in the form of yokes in order that they shall follow the various positions which the hubs 69 may assume in rounding curves, said yokes 68 straddling the hub 69.

When the lever 74 is released the spring 75 returns rod 72 to its normal position, whereupon the plug in the valve 31 establishes communication between the interiors of the cylinders 58 and 59 and the atmosphere, through cylinder 33, whereupon the compressed air within said cylinders is permitted to escape into the open air. The front brake shoes are therefore, first released and are moved upward by the pressure of the springs 71 and restored to their normal positions as seen in Figs. 5 and 6.

The escape of compressed air from the cylinder 33 releases the piston in it, slightly later in point of time, whereupon the levers 37 and 38 and their adjuncts are returned to their normal positions, thus releasing the rear brakes 43 and 48.

I claim—

1. In a device of the character stated, an air compressor, means for driving the same from the automobile engine, means automatically controlled for throwing said driving means into or out of operation, a valve controlling the disposition of air from said compressor, a brake cylinder having a piston, brakes actuated by the movement of the piston, a main driving clutch released with movement of the brakes, means for operating the valve, and automatic means for operating an additional brake after application of the first named brake.

2. In a device of the character stated, front and rear brakes, an air compressor, a brake cylinder having a piston, means in suitable connection with the piston for operating the rear brakes, and means actuated by the air from the brake cylinder for applying the front brakes after movement of the piston in the cylinder for applying the rear brakes.

3. In a device of the character stated, front and rear brakes, a brake cylinder, a piston therein, a connection between the piston and the rear brakes, a clutch released by operation of said piston, and a connection between the cylinder and the front brakes whereby they are applied after movement of the piston in the said cylinder to apply the rear brakes.

4. In a device of the character stated, an air reservoir, means for compressing air therein, a front stub axle, a pintle therefor, a front air brake cylinder in line with the pintle of the front stub axle, a piston therein, a brake wheel upon the front stub axle, a yoke brake thereon, and a connection between the piston and said yoke.

5. In a device of the character stated, a pump, a reservoir, a connection between the reservoir and pump, means whereby a uniform air pressure is maintained in the reservoir, a cylinder, a piston therein, a brake connected with the piston and operated thereby, a second cylinder having a piston, a front brake connected with said piston, and a connection between the two cylinders operative to set the piston in the one cylinder after the piston in the other cylinder has moved.

6. In a vehicle, brakes on the front wheel, brakes on the rear wheel, means for operating the brakes of the rear wheel, and automatic means for operating the brakes of the front wheel subsequent to the operation of the brakes of the rear wheel of the vehicle.

7. In a vehicle, means for providing air pressure, brakes on the front wheel, brakes on the rear wheel, a brake cylinder controlling the rear brakes, cylinders controlling the front brakes, connections between the brake cylinder and the controlling cylinders, and means for operating the said cylinders whereby the rear brakes of the vehicle are applied before the front brakes of the vehicle.

8. In a vehicle, brakes on the front wheel, brakes on the rear wheel, fluid cylinders having means for controlling said brakes respectively, an air reservoir, connections between the cylinders and brakes, means for admitting fluid to the rear brake cylinder to operate the rear brakes, and means for admitting fluid to the front brake cylinder after the piston of the rear brake cylinder has operated to set the rear brakes of the vehicle.

9. In a device of the character stated, a front stub shaft, a front brake cylinder, a piston therein, a rod therefor in line with the pivotal point of the front stub shaft, a brake wheel upon the stub shaft, and a brake connected with the piston rod and automatically following the position of the stub shaft.

10. In a device of the character stated, a front brake cylinder, a front stub shaft, a brake wheel upon said stub shaft, a piston for the cylinder in line with the pivotal point of the stub shaft, a piston rod, an extension from said piston rod over the brake wheel, and a brake yoke connected with the extension and straddling the brake wheel.

11. In a device of the character stated, an air compressor, an air tank receiving the air from the air compressor, a brake cylinder in suitable communication with said air tank and having a piston therein, rear brakes actuated by the movement of the piston in said brake cylinder, cylinders for the front brakes having pistons therein, brakes carried by said pistons and a communication between said cylinders and said brake cylinder controlled by the piston of said brake cylinder whereby the front brakes are actuated after the rear brakes have been actuated.

WILLIAM B. WEST.

Witnesses:
W. P. JACKSON,
C. D. McVAY.